INVENTOR
ALBERT R. DeBURGH
BY
Cook & Robinson.
ATTORNEY

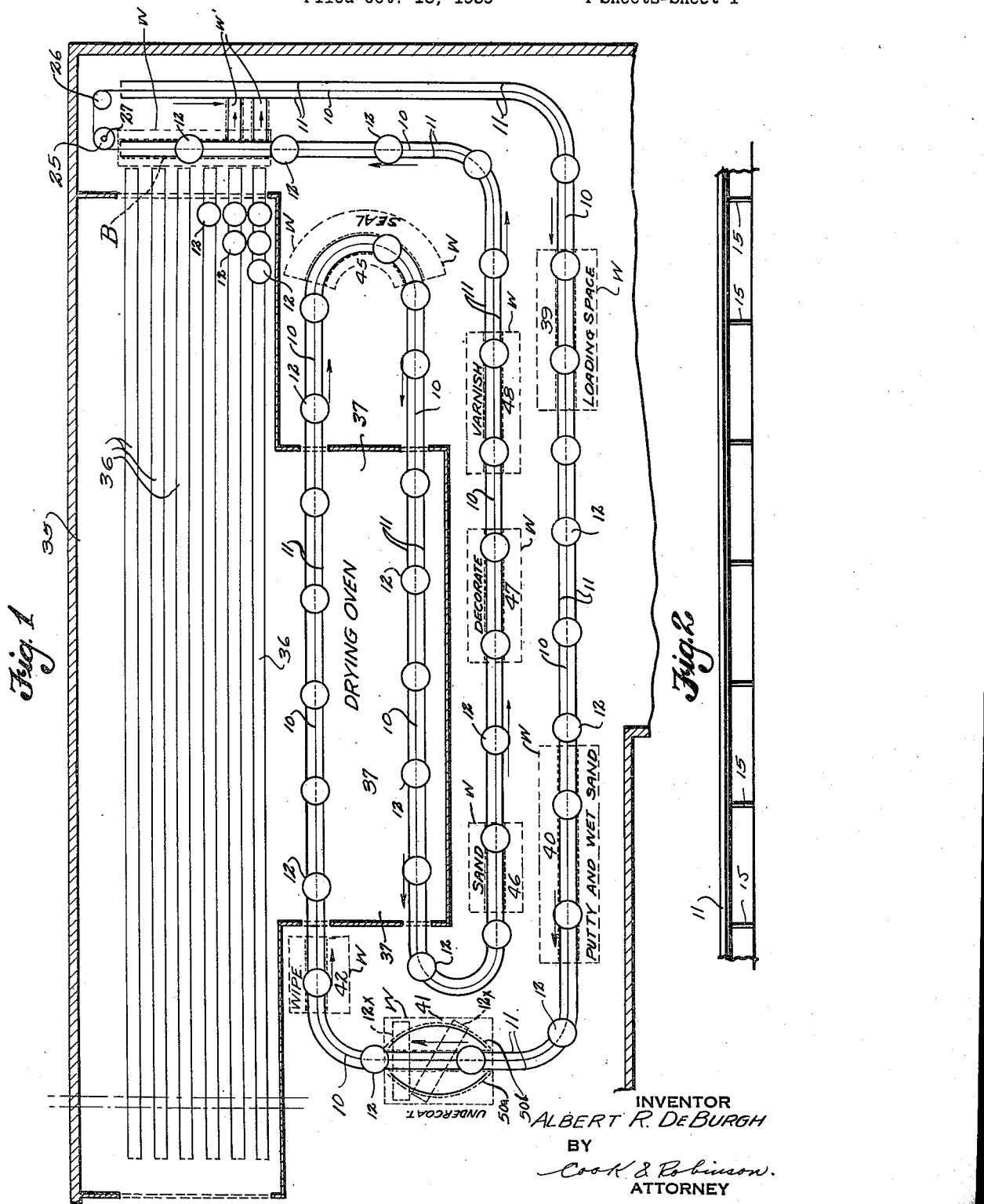

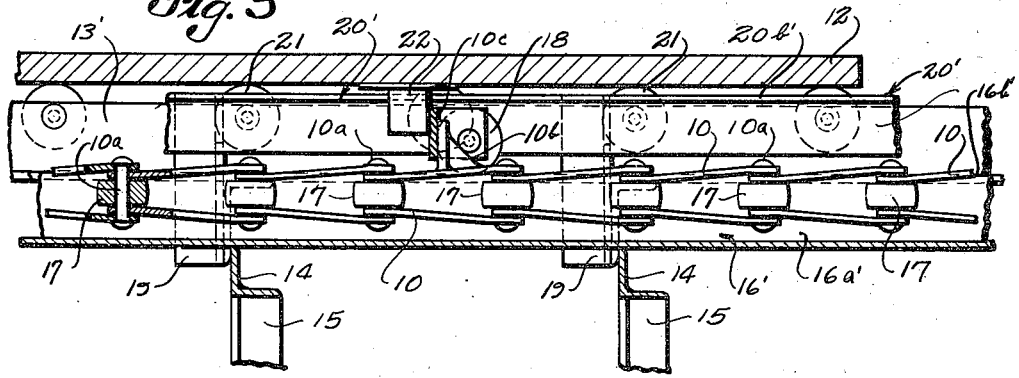
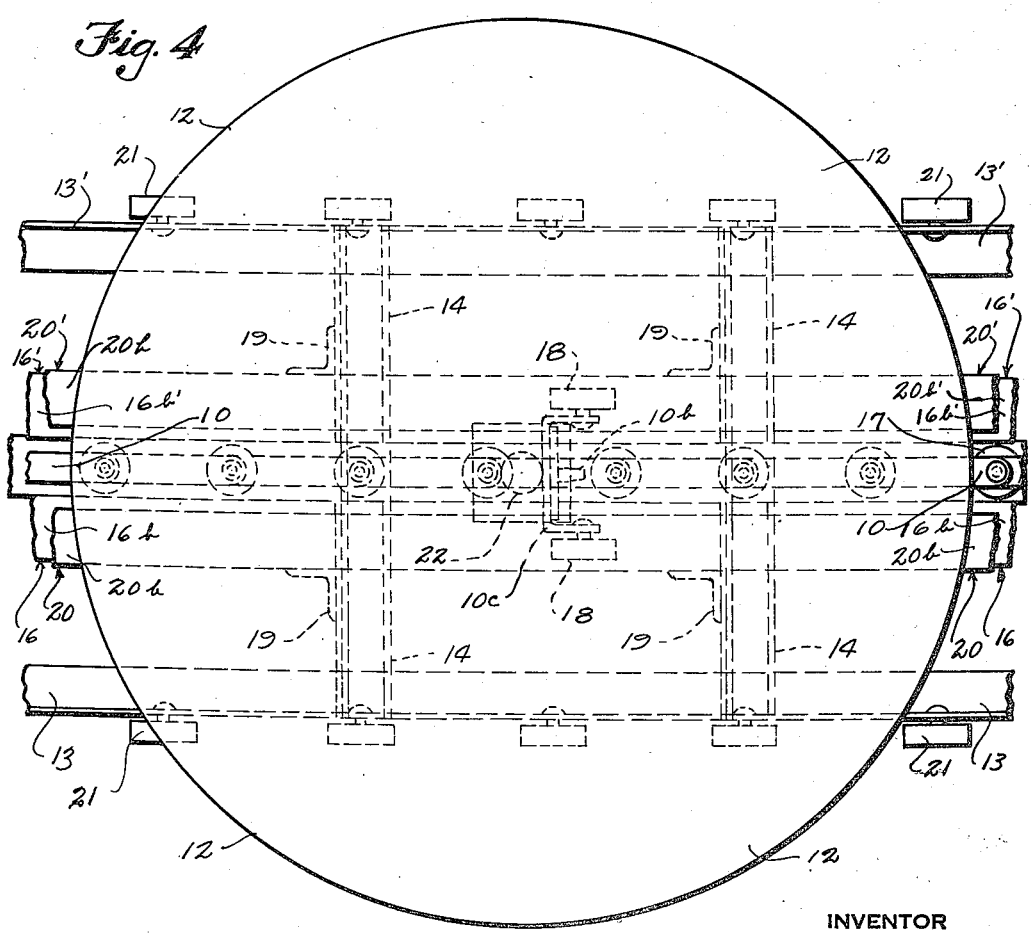

April 27, 1943.  A. R. DE BURGH  2,317,675
CONVEYER SYSTEM
Filed Oct. 16, 1939  4 Sheets-Sheet 4

INVENTOR
ALBERT R. DE BURGH
BY
Cook & Robinson
ATTORNEYS

Patented Apr. 27, 1943

2,317,675

UNITED STATES PATENT OFFICE 2,317,675

CONVEYER SYSTEM

Albert R. De Burgh, Bellingham, Wash.

Application October 16, 1939, Serial No. 299,690

12 Claims. (Cl. 198—181)

This invention relates to conveyer systems, and to conveyers as employed in the manufacture, assembly, finishing and packing of various articles of manufacture, and it has reference more particularly to an improved method of utilizing conveyers and conveyer accessories for a more expeditious and economical manufacture or finishing of articles of furniture, or for the assembly or manufacture and finishing of other articles which require that a succession of operations or treatments be performed thereon; such, for example, as in the finishing of articles of furniture, where it is required that they be sanded, puttied, sanded, stained, wiped, dried, sealed, dried again, sanded again, shaded, decorated, lacquered and/or varnished, finally dried, then wrapped and packed.

The principal object of this invention is to provide a novel method of use and improved features in the construction of conveyers, whereby to overcome the disadvantages and undesirable features that are encountered in those systems now generally in use.

More specifically stated, the objects of the present invention reside in the details of construction of and in the association of a series or plurality of conveyers, wherein certain selected ones are powered for continuous travel along definite tortuous paths for the conveyance of work mounting pallets therealong, past stations at which workmen are located for performing specific operations on the work pieces or articles being carried by the pallets and with provision of means at the various stations for revolving the pallets to expedite the work being done.

Other objects of the invention reside in the provision of a conveyer system whereby the following advantages are attained:

A conveyer system that best meets the present day industry, for example, in the finishing of furniture, and which is applicable to either powered or non-powered conveyers.

A system that makes possible an increased production per man hour, and per foot of space occupied.

A system that reduces the labor of handling pieces being worked on; that has greatly improved facility of operation; which has great flexibility in the variety of work which it will accommodate; which is economical to construct, install and operate.

A system in which all overhead structures are eliminated, thus avoiding the possibility of dust or dirt falling therefrom to newly finished wet surfaces.

A system that conserves floor space to the maximum extent.

A system which permits the work pieces to be temporarily stopped at any point for detailed inspection or detailed work, without stopping the conveyer, and which also permits the work to be advanced ahead of the travel of the conveyer when this is desired.

A system wherein the operator may rotate the pallets as desired to expedite finishing or work on any piece.

A system wherein pallets may be quickly transferred from one conveyer to another while work remains thereon, and wherein this transfer of pallets may be made at any angle.

A system which provides for a "solid pack" arrangement without removal of work from pallets; which provides for the conservation of space and heat, particularly in a drying oven.

A system that provides for the use of pallets of any size that will best suit the work being done, which is continuous in operation, which permits quick and easy change in spacing of pallets.

A system that provides for the economical use of varnish or other relatively slow drying material without necessitating the removal of work from the pallets for drying in process of or before packing.

Still further objects of the invention reside in the provision of caster beds at designated stations for the rotation of the pallets thereon, and in the provision of novel means for causing or controlling rotation of the pallets at the selected stations or locations; in the details of construction of means for the advancement of pallets by the conveyer, and in the provision of novel means for the transfer from a conveyer following one path of travel to a conveyer following another, and for permitting ready variation in spacings or a "solid pack" arrangement of pallets, as might be desired or required for any particular work being done.

A further object of the invention is to provide a system and an apparatus that permits, if it be so desired, the entire operation of assembling, finishing and packing articles to be accomplished without necessitating that the articles be removed from the pallets on which they are placed at the start of the line.

Other objects of the invention reside in the details of construction of parts, in their assembly and mode of operation and use, as will hereinafter be fully described.

In accomplishing these and other objects of the invention, I have provided the improved details of construction, the preferred forms of which are illustrated in the accompanying drawings, wherein—

Fig. 1 is a plan view, diagrammatically illustrating a system of conveyers as constructed and employed in the carrying out of the method embodied by the present invention.

Fig. 2 is an elevation of a portion of the conveyer system.

Fig. 3 is an enlarged sectional detail longitudinally of a conveyer and its supporting guideway.

Fig. 4 is a plan view of one of the pallets and a portion of the trackway.

Figure 5:
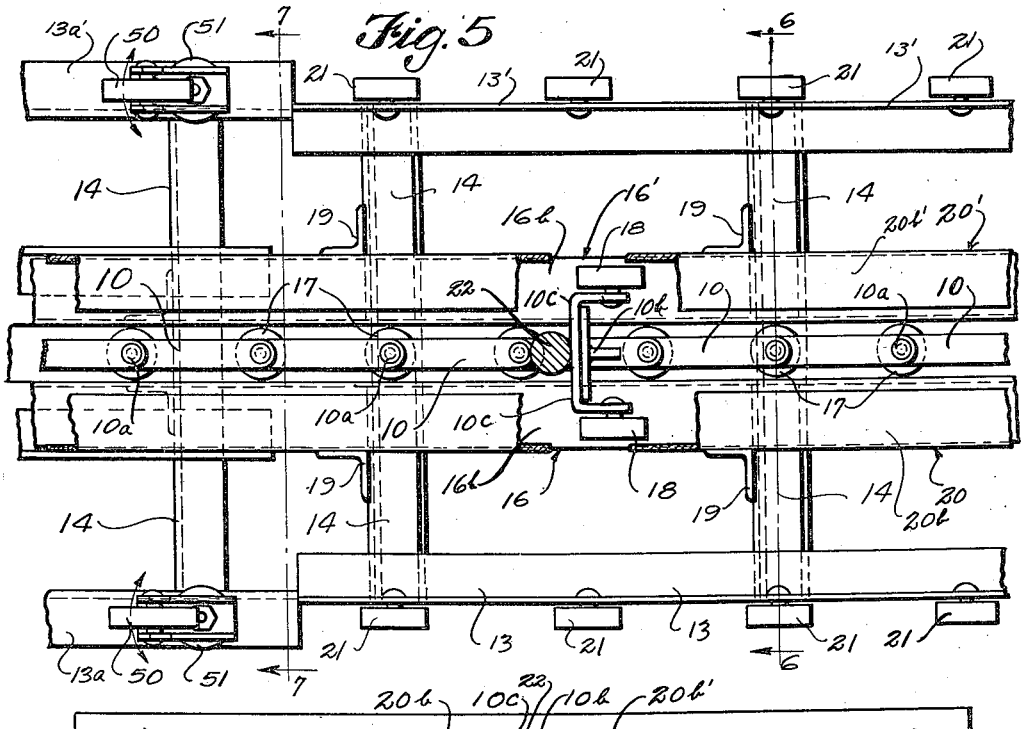
Fig. 5 is a plan view of a part of the trackway, including a caster section.

It is to be understood that the present conveyer system is applicable to numerous operations and to various arrangements which might vary considerably, dependent upon the nature of the plant and the character of the work being done. For example, a system as planned for the making or finishing of automobile bodies, or for the assembly of parts of a chassis, would obviously contemplate different operations and a different sequence than would be required for finishing a line of furniture. However, the use of conveyers, caster bed, and pallets in each of these cases, would be similar in that, in each, the articles being assembled, or worked on, would be conveyed along fixed paths, past various stations where workmen would perform definite operations thereon, and would finally be carried to a point of storage, drying, dismounting or discharge. It is intended, in this instance, that the articles as advanced by the conveyer, be carried on platforms or pallets that the pallets be free for advancement relative to the conveyer and thus make possible a period of rest, that there be provision for variation in the spacing of the pallets, as required in accordance with work being done; that there be provision either for automatic or manual rotation of the pallets at the caster stations, and to provide automatic means to cause them to rotate at the most practical or at desired speeds; that the pallets be easily demountable or easily transferred while loaded from the trackway for adjustment in spacing, for "solid pack" arrangement or for return to start of the system.

In the present drawings, I have, for purpose of easier explanation, illustrated a system of conveyers that is adapted to the finishing of various pieces of household furniture, but it is to be understood that the arrangement of conveyers and stations might be varied without departing from the spirit of the invention, and that this is only illustrative of one of a great number of arrangements that are possible.

Referring more in detail to the drawings—

In Fig. 1, I have shown, in plan view, a system that contemplates that the articles to be worked on are delivered to the conveyer in assembled condition and, at a designated station, are loaded onto the pallets as they are successively placed upon or as they are brought by the conveyer belt into position. Then the articles, as placed on the selected types or sizes of pallets, are advanced to a station where they are inspected for certain defects in the wood, and the defects there puttied or repaired. Next they are moved through a station where an undercoating of stain is applied thereto, and after the application of the stain, they are moved through a station where the articles are wiped, and they are carried by the conveyer through a drying oven. From the oven, the dried articles are delivered temporarily from the oven for the application thereto of a sealing or priming coat; then the continuously moving conveyer carries them back through a drying oven for a second drying operation. On again coming out of the oven, the dry articles are carried past a station for smoothing and sanding; and then in succession, through stations for shading, decorating, striping and varnishing, and are finally conveyed to a location for transfer from the continuously moving powered conveyer to conveyers on which they may be arranged in close pack formation and advanced slowly through a drying oven.

The articles are mounted upon pallets selected as best suited for the work being done, and it is intended that provision be made at the work stations for rotating the pallets in order that all sides of the articles may be brought before the workmen without necessitating the article being handled or the workman moving with his tools and supplies.

It will be understood that various operations or treatments might be added or omitted from the system as here illustrated, dependent upon the character of article being worked on, but such variations would not patentably change the system. Therefore, it may be considered that the system now to be described is merely illustrative and should in no way operate as a restriction on the scope of the appended claims.

In accordance with the above recited requirements for the stated type of furniture, I utilize a continuous chain belt conveyer, operating in trackways which guide and carry it through the various stations as above noted. The conveyer chain is of the roller type and is designated in its entirety by reference numeral 10, and the guideways therefor comprise a part of a pallet trackway, indicated generally by reference numeral 11, on which the pallets 12 are supported while advanced by the moving chain belt. The pallets are here shown as being circular, but might be square, hexagonal, oblong or any other suitable shape.

The trackway is elevated to a convenient working height, as may be desired, as illustrated in Fig. 2, and it comprises horizontally spaced, angle iron top rails 13—13, supported by and joined together at regular intervals by cross bars 14. The cross bars, in turn, are supported at the desired elevation by vertical legs designated in Fig. 2 at 15.

Extending the full length of the guideway, and medial of the spaced opposite side rails 13—13', is the chain belt guideway formed by two parallel, spaced angle iron rails 16—16' which are fixedly mounted on the cross bars 14. The two rails have parallel vertical flanges 16a and have horizontal flanges 16b in the same plane, and the conveyer chain is disposed between these two rails and the links thereof are joined by pivot pins 10a which mount rollers 17. In passing around a curve or turn in the guideway, the chain rollers 17 will have rolling contact with the flange 16a at the inside of the turn. At regular intervals along the belt, attachment links 10b are inserted, as seen in Fig. 3, having cross plates 10c that transversely overlie the rails 16 and 16', and at opposite ends mount rollers 18, adapted for travel upon the rail flanges 16b, to support the chain, while it is guided about the horizontal turns and bends of the tortuous trackway by rollers 17.

Figure 6:
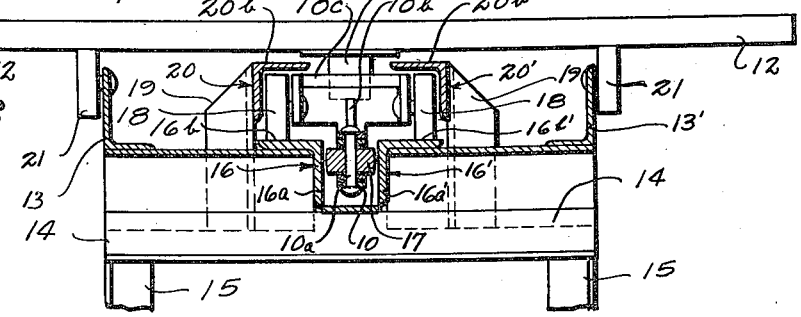
Fig. 6 is a cross-sectional detail of the trackway, illustrating the means for supporting and moving a pallet therealong.
Figure 7:
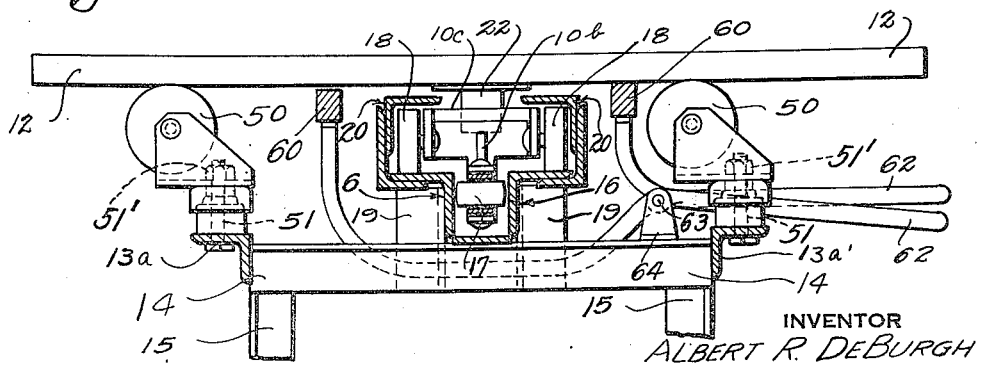
Fig. 7 is a cross sectional detail at one of the caster sections, as seen on the line 7—7 in Fig. 5.

It will further be noted by reference to Figs. 6 and 7, that brackets 19—19' are mounted vertically on the cross bars 14 at opposite sides of the chain guideway, and that these support angle bars 20—20' spaced above the rails 16—16' and lengthwise of the guideway, with flanges 20b overlying the supporting rollers 18 of the chain to prevent the chain belt jumping the track.

In the use of the pallets, they are placed symmetrically upon the trackway, as noted in Figs. 4 and 6, and are supported for easy advancement upon rollers 21 that are mounted at close intervals along the rails 13 and 13'. Each of the pallets has a central stud 22 attached to its under side and this is designed to project downwardly between the rails 20—20' and to be engaged by any one of the cross plates 10c on the links 10b as a means for advancing the pallet along the trackway. The stud, in this case, acts as a retaining means that keeps the pallet on the trackway. It is preferred that the pallets be of plywood, or similar material, for the sake of lightness, and that the studs be centrally thereof to permit the pallets to be rotated, particularly while moving through the various stations at which the finishing operations are performed thereon.

As an alternative means for guiding and advancing the pallets, vertical studs might be attached to or formed as a part of the attachment links of the chain, and the pallets provided with central holes to receive these studs.

It will be explained that the chain belt may be driven by any suitable power device and that its rate of travel may be governed through any suitable change speed gearing. In Fig. 1, I have indicated the chain belt as being driven by a sprocket wheel 25, and extending about a slack take-up sprocket, at 26. The sprocket 25 has a drive shaft 27 and this might be driven by connection with any suitable power device, not here shown.

The layout, as shown in Fig. 1, discloses a drying oven 35 containing a plurality of parallel trackways 36, and having a lateral extension at one side as indicated at 37, for the initial drying operation. This may or may not be a part of the oven 35, as desired. The continuous, driven conveyer belt 10, and its guideway, extend from the location of the driving sprocket 25, around the slack take-up sprocket 26, then makes a right angle turn and extends for a distance in a direction parallel with that end of the main oven, then makes a second right angle turn and extends through the loading station 39, then through a station 40, where puttying and sanding are done; then makes a turn, passing successively through the under coating station 41, and wiping station 42, and directly through the drying oven 37. On passing from the oven, the conveyer makes a reverse, semi-circular turn, passing through a sealing station 45 and again passes directly through the drying oven, merging therefrom and making another semi-circular turn and returning parallel to, but moving oppositely to the conveyer in passing through the loading zone, through a sanding station 46, decorating station 47 and varnishing station 48, then making a quarter turn and returning directly to the driving sprocket wheel 25.

It will be noted by reference to Fig. 1, that on the return of the conveyer to the driving sprocket wheel, the last straight run passes transversely of and quite close to the ends of the parallel trackways 36, and this permits an easy transfer of pallets from the belt 10 to any of these guideways. To facilitate this transfer of pallets, I have provided caster beds indicated at B in Fig. 1 along the transfer portion of the track, and these beds will permit the transfer to any of the selected conveyers 36 and also a reversal of direction of the pallets if this should be desired. It is understood that where this transfer is to be made, the guide rail 20 at that side of the guideway would be removed so as not to cause any interference with the stud on the pallet.

Also, I have provided transfer caster beds W' between the parallel runs of the conveyer constituting the initial and discharge ends, on which pallets may be transferred back to the conveyer for again passing through the various stations for additional work.

Figure 8:
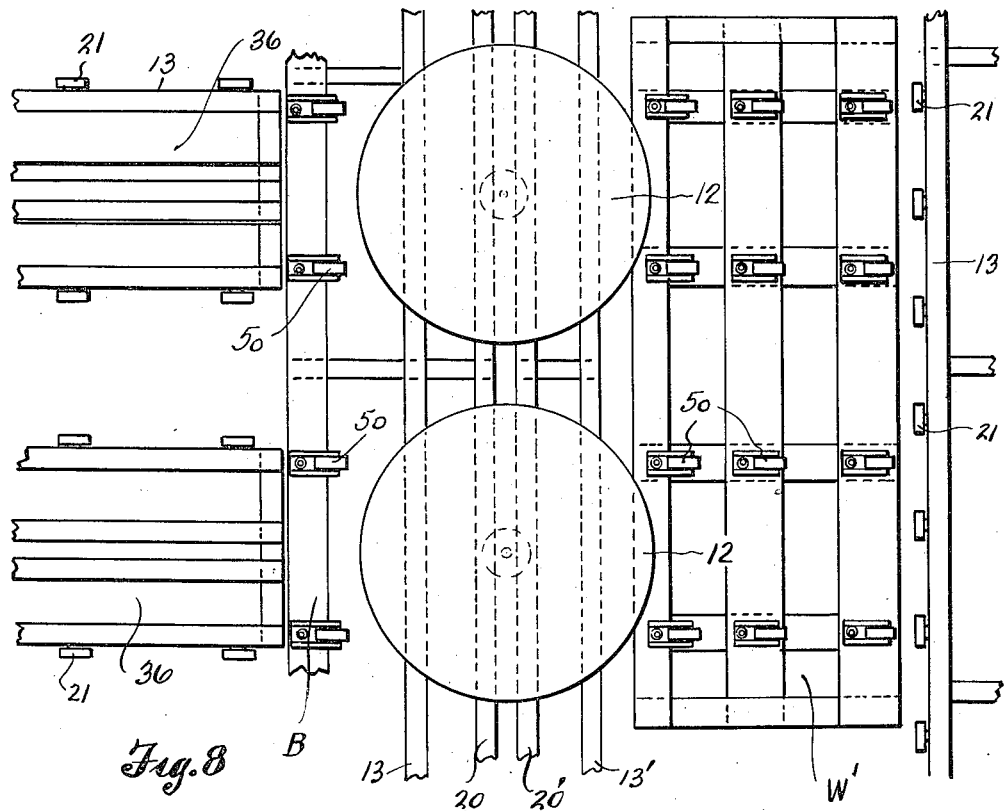
Fig. 8 is an enlarged plan of the arrangement of caster beds for transfer of pallets.
Figure 9:
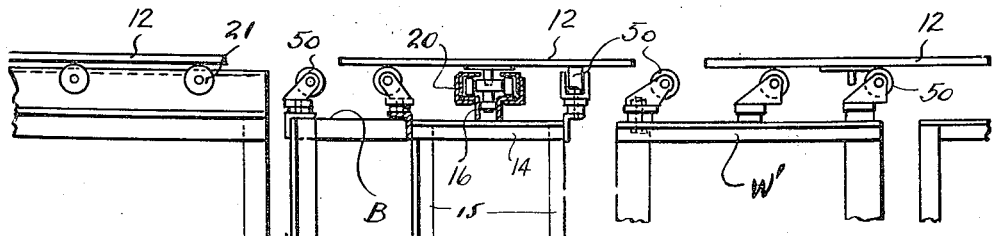
Fig. 9 is a vertical section on the line 9—9 in Fig. 8.

In Figs. 8 and 9, I have illustrated the arrangement of the transfer caster beds, which in Fig. 1 are indicated generally by reference characters B and W'. Each of these caster beds comprises a plurality of casters 50 rather closely arranged in the same horizontal plane and at the same lever as the casters which support the pallets for travel along the adjacent portion of the main trackway; it being understood that the pallets, in passing along this main portion of the trackway, may be rotated and moved laterally either for transfer across the bed B to the trackways 36, or across the caster beds W' for return to the main conveyer system.

A feature of this invention resides in the provision of means at the various stations for rotation of the pallets as they are advanced. While this rotation might be manually done, it may also be desirable to effect it automatically. It will be explained here that at the various work stations, as have been designated by reference character W in Fig. 1, the pallet supporting rollers 21 for advancement of the pallets along the track are replaced by caster wheels 50 supported for pivotal movement about vertical pivots 51 fixed in the rails 13a—13a'. The caster wheels are arranged to support the pallets thereon, as do the wheels 21, but, by reason of their mountings, will automatically position themselves in accordance with the direction of rotation and forward travel of the pallets under influence of the moving conveyer belt. Manual rotation of a pallet would be accomplished by the workman merely pushing or pulling on its edge in a tangential direction.

As an alternative for the caster supports, ball bearings might be employed, or any other form of support that would not interfere with free and easy advancement of the pallet while at the same time permitting its rotation. Casters are desirable because of their simplicity and ready adaptability to this requirement.

Various means might be employed to cause the pallets to rotate as they advance through the various work stations; one of which ways being merely to adjust and then fix one or more of the casters 50 at one side or the other of the trackway in positions at which they will have the effect of retarding the advancement of the pallet at that particular side. The direction of travel of the conveyer and the selection of a caster at one or the other side of the track will determine which way the pallet will rotate and the angular setting of the selected caster will determine the relative rate of rotation of the pallet. The fixing of the caster after an adjustment thereof had been made can be effected by the tightening of the nut 51' on the caster pivot bolt 51 against the caster mounting. When the nut is loosened, the caster is free to pivot and therefore has no rotating influence on the pallet.

Another means provided as an alternative for causing rotation of the pallets in passing through the selected work stations is an arrangement of brake bars located below the level of the pallets at opposite side of and parallel with the track. In Fig. 7, I have indicated brake bars 60—60 at opposite sides of the track. These are supported from the inner ends of angular brake levers 62 which, in turn, are supported by horizontal pivots 63 held in brackets 64 that are affixed to the frame structure. The levers 62 extend horizontally to the workman's side of the track. It is understood that by depressing the extended end of a lever, the corresponding brake bar 60 will be moved up against the under side of the pallet to cause an eccentric drag thereon. The particular selection of brake lever determines the direction of rotation, and by varying the amount of pressure applied through the brake bar, the rate of rotation may be varied accordingly.

Where pallets of substantial length are used, for example, a pallet 80 inches long, it is desirable to extend the width of the caster bed by the placing of an extra arcuate line of casters at each side and outside of the main guideway for support in turning a pallet, as is indicated, for example, at the undercoating station in Fig. 1; the extra lines of casters being designated at 50a—50b and the pallet at 12x.

With the present conveyer system, the pallets may be of any selected size, to best accommodate the work pieces being worked on, and the attachment links may be spaced as required. Furthermore, since the pallets are not fixed to the belt, they may be spaced as required, and a pallet may be pushed ahead at any time to give it a period of rest for some particular work, while its advancing link is catching up to it. This is a decided advantage in some operations.

This system, in actual use as illustrated, has proven its value by a material saving in labor, with an increased production of goods. In fact, with a 50% labor reduction per unit, there has been a 150% increase in unit production.

Having thus described my invention, what I claim as new therein and desire to secure by Letters Patent is:

1. In combination, a conveyer means including a guideway leading through a succession of work stations, a work mounting pallet associated with the conveyer for guided travel therealong by the guideway through the work stations and means located at the work stations onto which the pallet will be directed by the guideway for a continuation of travel and for rotation while at the work stations without disassociation of the pallet from the guideway.

2. In a system of the character described, a main trackway leading through a succession of work stations, and a plurality of receiving trackways, each with an end terminating adjacent the main trackway, a guideway extending along the main trackway, a plurality of work mounting pallets mounted for travel on the trackways, a guide stud fixed to each pallet and extended downwardly therefrom into the guideway slot for engagement by a belt abutment for advancing the pallet along the trackway and for retaining a pallet against lateral displacement from the trackway, and anti-friction supports located between the main trackway and the adjacent ends of the receiving trackways across which the pallets may be transferred from the main trackway to any of the receiving trackways.

3. In a system for the character described, a conveyer means leading through a succession of work stations, work mounting pallets associated with the conveyer for travel in succession therealong, each independently of the others for variation in spacing and intermittent travel, and means located at the work stations onto which the pallets will be directed by the guideway and supported for continuation of travel and for rotation at the work stations.

4. In a system of the character described, a conveyer means leading through a succession of work stations, a power driven belt operable along the conveyer means, work mounting pallets associated with the conveyer means for travel therealong, cooperating means on the belt and on the pallets for the advancement of the pallets, and supports at the work stations onto which the pallets will be directed for conveyance through the stations and on which they may be rotated without disassociation from the conveyer means.

5. In a system of the character described, a continuous guideway leading through a succession of work stations, a continuously moving belt operable along the guideway, conveyer rollers mounted along the guideway between the stations, work mounting pallets associated with the guideway for support and travel on said rollers and for guidance by the guideway in travel, cooperating means on the belt and on the pallets for the advancement of the pallets along the guideway and permitting variation in their spacing within predetermined limits, and supports at the work stations onto which the pallets will be directed for their continuation of travel through the station and for rotation.

6. In a system of the character described, a trackway leading through a succession of work stations, a belt guideway extending along the trackway, an endless conveyer belt operable in the guideway, work mounting pallets removably mounted on the trackway overlying the belt guideway, and adapted to be advanced along the trackway, a pivot means on the under side of each pallet, extended into the guideway for contact by an abutment thereon, for advancement of the pallet along the trackway and whereby the pallet will be retained from lateral displacement from the trackway while being advanced by the belt; said trackway including means therein at the work stations for supporting the pallets and upon which the pallets may be rotated while advanced by the belt through the stations.

7. In a system of the character described, a trackway leading through a succession of work stations, a conveyer belt guideway leading along the trackway and having a longitudinal slot, an endless conveyer belt mounted for travel in the guideway and having abutments thereon at spaced intervals, a plurality of work mounting pallets removably mounted upon the trackway for travel therealong and overlying the guideway and belt, a pivot stud fixed to and projecting downwardly from each pallet for travel in the said belt guideway slot whereby to retain the pallet in its travel against displacement from the trackway, and for retention thereby in the path of travel of the conveyer belt abutments for the advancement of the pallet along the trackway; said trackway having incorporated therein at the work stations, pallet supporting means on which the pallets may be rotated about their pivot studs; said pallets being movable along the trackway independently of the belt except as limited and influenced by the belt abutments between which their respective pivot studs are disposed.

8. A system as set forth in claim 7 wherein the supports for the pallets, incorporated in the track at the work stations, comprises wheels on casters mountings, permitting rotation of the pallets thereon as advanced through the stations by the conveyer belt and an automatic adjustment of the caster wheels in accordance with the rate of advancement and extent of rotation.

9. In a conveyer system, a trackway leading through a work station, and including a chain guideway, a continuously moving conveyer belt mounted for travel in the guideway and equipped at spaced intervals therealong with links each with an abutment cross bar, pallets mounted for travel on the guideway and each having a stud mounted thereon extending downwardly into the guideway to be engaged by one of said abutment bars, for the advancement of the pallet; and means at the work station for the rotatable support of the pallets and means operable to cause an eccentric drag on the pallets as advanced through the station to automatically cause rotative motion to be imparted thereto.

10. In a conveyer system of the character described, the combination with a trackway, a guideway extending along the trackway and a conveyer belt operable in the guideway and having abutments thereon, of a pallet mounted for travel along the trackway, a pivot stud extended therefrom for guided travel in the said guideway and for engagement by a belt abutment, and means disposed within certain sections of the trackway for the support and rotation of the pallets thereon.

11. In a system of the character described, a main trackway leading through a succession of work stations, and a plurality of receiving trackways, each with an end terminating adjacent the main trackway, a belt guideway extending along the main trackway, and having a longitudinal slot, a conveyer belt mounted for travel in the guideway and having abutments at spaced intervals therealong, a plurality of work mounting pallets mounted for travel on the trackways, a pivot and guide stud fixed to each pallet and extended downwardly therefrom into the guideway slot for engagement by a belt abutment for pushing the pallet along the trackway and for retaining the pallet against lateral displacement from the trackway, a caster bed located between the main trackway and the adjacent ends of the receiving trackways across which pallets may be transferred from the main trackway to any of the receiving trackways, and slotted guideways extending along the receiving trackways for reception of the pallet studs to retain the pallets against lateral displacement from these trackways while advanced therealong.

12. A system as recited in claim 10, wherein means is provided for effecting an eccentric drag on a pallet as it passes through the caster wheel sections of the trackway to impart rotative motion thereto under the influence of the conveyer belt.

ALBERT R. DE BURGH.